April 22, 1952 A. C. TEN CATE 2,594,246

PHONOGRAPH

Filed April 18, 1949 2 SHEETS—SHEET 1

INVENTOR.
ARTHUR C. TEN CATE
BY
Robert L Kahn
ATTORNEY

April 22, 1952 A. C. TEN CATE 2,594,246

PHONOGRAPH

Filed April 18, 1949 2 SHEETS—SHEET 2

INVENTOR.
ARTHUR C. TEN CATE
BY Robert L. Kahn
ATTORNEY

Patented Apr. 22, 1952

2,594,246

UNITED STATES PATENT OFFICE 2,594,246

PHONOGRAPH

Arthur C. Ten Cate, Downers Grove, Ill., assignor to Oak Mfg. Co., Chicago, Ill., a corporation of Illinois Application April 18, 1949, Serial No. 88,213

3 Claims. (Cl. 274—10)

This invention relates to a phonograph and aims to provide a simple and effective construction of the center post drop type of record changer. In particular the invention herein relates to the center post or turret construction.

The record changer forming the subject matter of the present invention is adapted to operate on records turning at 45 R. P. M. and recently introduced into the market. Such records have a central aperture substantially larger than prior art records and such new records have the edge thereof at the aperture reduced in thickness. The entire mechanism for maintaining a stack of records in position and feeding records sucessively to a turntable is disposed within a cylindrical shroud extending through the record aperture. The shroud and mechanism within revolves with the turntable.

In accordance with this invention, record retaining and record catching fingers are provided. Such fingers are formed at the upper end of elongated rockers operating generally with a scissors-like action. One pair of record retaining and catching fingers comprises a unit and in order to operate satisfactorily, at least two such units are required angularly disposed on the turret.

The changer comprises the usual turntable on a motorboard with the turret extending above the turntable and mechanism disposed below the motorboard. This mechanism below the motorboard is adapted to cooperate with a tone arm for initiating a cycle of changer operation. In addition to the conventional operation of elevating and swinging the tone arm, the mechanism also provides oscillating vertical movement to a suitable means extending inside the turret for actuating the record handling units. Thus assuming that a cycle of operation is initiated, one complete turn of a cycling gear will result in a complete oscillation in a vertical direction of the means for operating the turret mechanism. This turret mechanism first projects a record catching finger between the two bottom records and then withdraws the record retaining finger at the bottom of the stack. This permits the bottom record to drop. Thereupon the record retaining finger is projected and the record catching finger is withdrawn to permit the entire stack to settle down for a distance corresponding to the thickness of one record in preparation for a new cycle.

Figure 1:
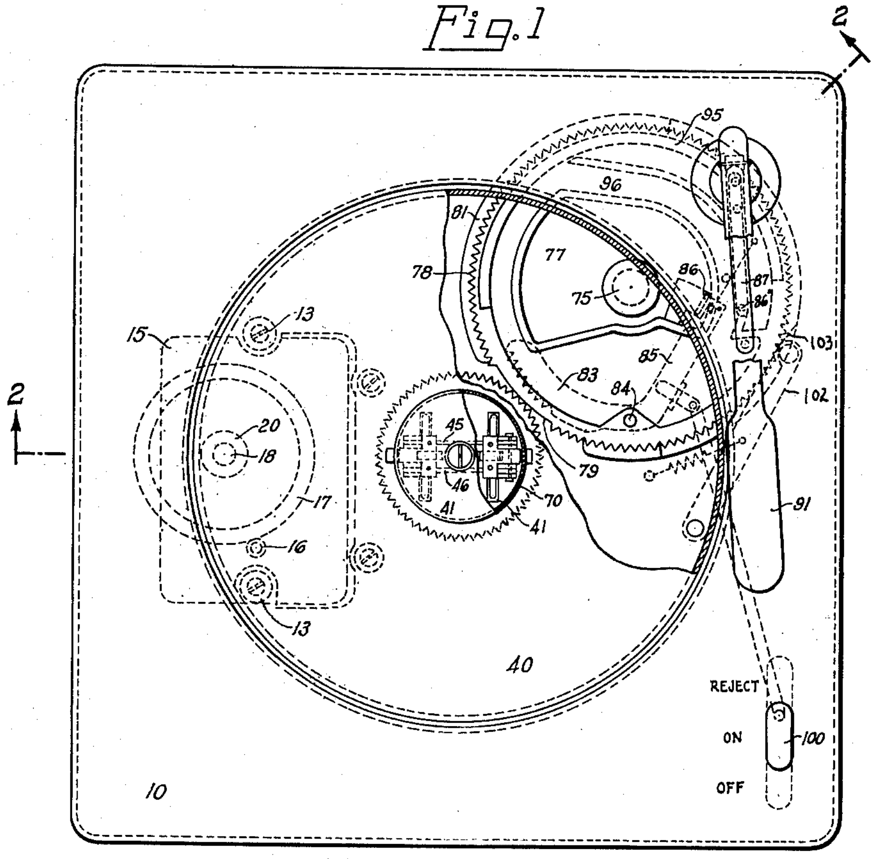
Figure 2:
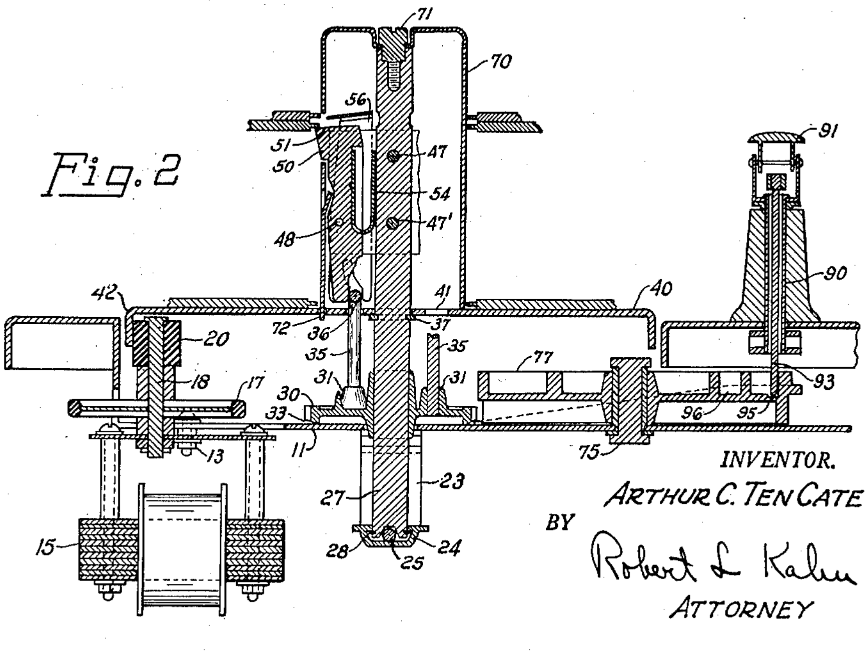
Figures 3, 4, 5, 6:
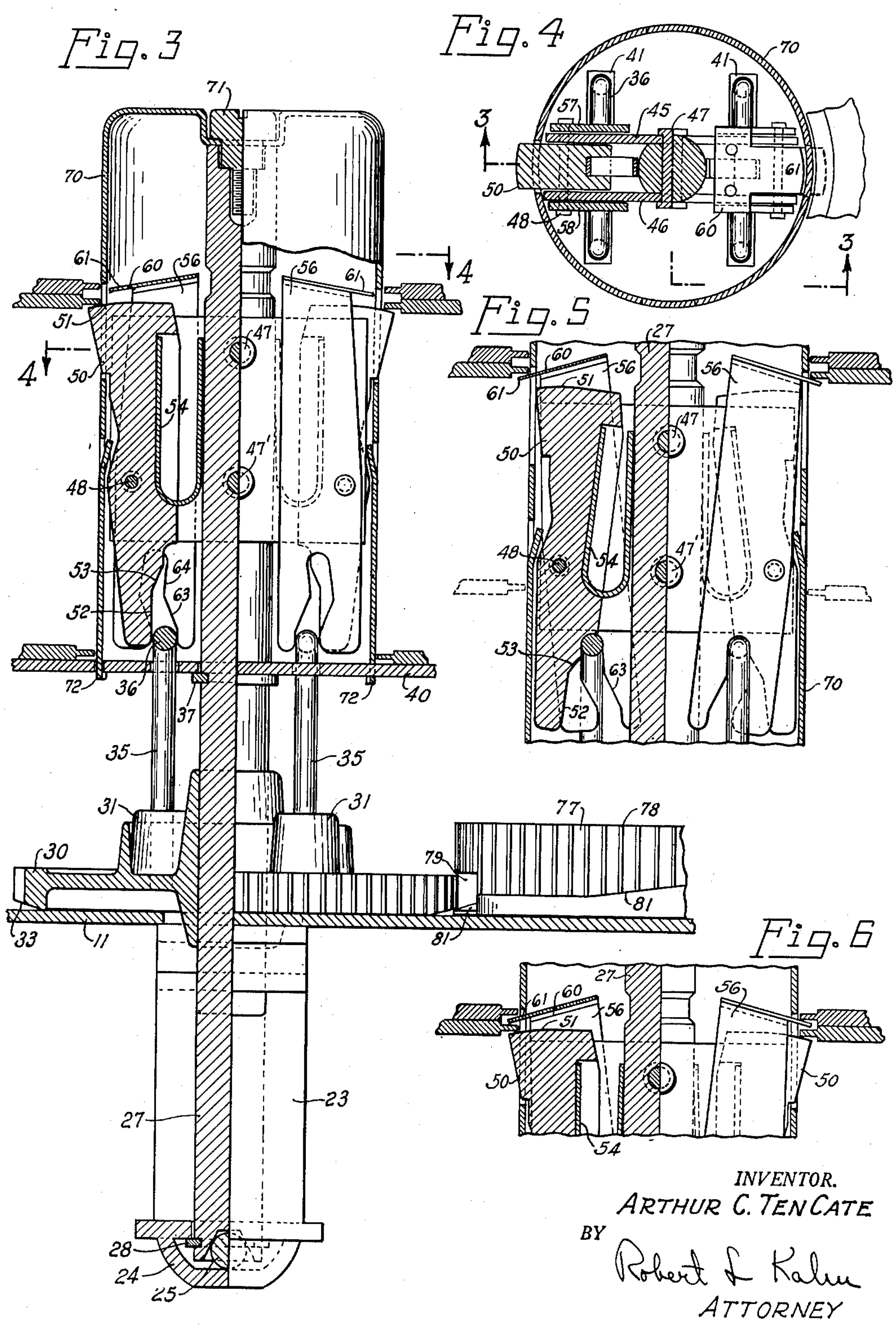

In order that the invention may be understood, it will now be explained in connection with the drawings wherein Figure 1 is a top plan view, with certain parts broken away of a record changer embodying the present invention. Figure 2 is a section on broken line 2—2 of Figure 1. Figure 3 is an enlarged sectional view on broken line 3—3 of Figure 4 showing the record feeding means in a normal position. Figure 4 is a sectional view on broken line 4—4 of Figure 3. Figure 5 is a detail of part of the mechanism shown in Figure 3 after a record has been released.

Figure 6 is a sectional detail of the record feeding means in an intermediate position during a record feeding cycle.

Referring now to the drawings, motorboard 10, preferably of pressed steel, has circular well 11 upon which is bolted at 13 drive motor 15. The motor has shaft 16 engaging large rubber covered wheel 17 rotating around axis 18. Concentric with wheel 17 is small rubber drive shaft 20 extending adjacent the vertical wall of the well. This drive is conventional in the art.

Well 11 carries bearing 23 depending from the center thereof. Bearing 23 has end cap 24 of hardened steel within which ball bearing 25 may roll. Supported for rotation within bearing 23 and resting upon the ball bearing is the journal portion of spindle 27, the spindle itself extending for a substantial distance above well 11. In the description of the mechanism, the record changer will be assumed to be in a normal position for use with motorboard 10 horizontal and well 11 depending downwardly therefrom.

Spindle 27 rotates with the turntable and in all instances should have substantially no vertical movement other than the normal play of parts arising out of manufacturing tolerances. To this end spindle 27 has C washer 28 disposed in a suitable slot immediately below the bottom end of bearing 23.

Rotatively disposed on spindle 27 and above well 11 is gear 30 having bosses 31 at the top surface thereof. Gear 30 has lower peripheral portion 33 undercut so that a cam may extend beneath the same and operate on the gear. Gear 30 carries a number (here shown as two) of double key members 35 having a general U-shape with portion 36 on each key member forming the cross piece of the double key member. Spindle 27 has split washer 37 disposed in a slot thereon at a distance above gear 30 and resting upon this washer is turntable 40. The turntable has slots 41 so positioned that key members 35 may extend through the turntable and be vertically slidable with respect to the turntable. As shown, one slot 41 is adapted to accommodate a double key member. It is possible however, to have individual apertures for the key portion proper since cross piece 36 will always remain above the turntable. However, this would require the removal of a key member from the gear to disassemble or assemble the turntable from the remainder of the mechanism. By having elongated slots to accommodate a double key for each slot, the turntable may be removed quite easily. It is understood, however, that each slot is preferably dimensioned to provide a snug fit for a double key member.

In accordance with usual practive, rubber drive wheel 20 is adapted to engage the inner surface of skirt 42 of the turntable. It is understood that the entire motor drive including the rubber wheels are mounted as a unit with a spring urging wheel 20 against the turntable skirt.

The upper portion of spindle 27 carries supporting plates 45 and 46 rigidly disposed in spaced parallel planes on opposite sides of the spindle. These plates lie in vertical planes and are pinned at 47 and 47' to the spindle. The spindle itself is preferably cut to provide flat undercut faces against which the plates may bear firmly. Inasmuch as the record feeding structure is duplicated on the two sides of the spindle, only one side will be described in detail. It is understood that instead of two record feeding assemblies on opposite sides of the spindle, there may be three or more such assemblies uniformly arranged around the spindle.

Referring now to a record feeding unit, plates 45 and 46 have pivot pin 48 passing therethrough horizontally. Pivotally mounted on pin 48 and disposed between plates 45 and 46 is record retaining rocker 50 having record supporting face 51 at the top end thereof and having cam surface 52 and cam surface 53 above cam surface 52 formed on the inside end at the bottom thereof. Leaf spring 54 is wedged in the space between the spindle surface and the rear face of rocker 50. As shown in Figure 3, spring 54 normally biases rocker 50 so that retaining face 51 is in its outward position while cam face 52 is vertical. The record feeding structure is so arranged on the spindle that gear 30 in its bottom position disposes cross piece 36 of the double key members just in contact with the bottom end of the rocker and bearing against the cam face.

Straddling plates 45 and 46 is record catching member 56 having sides 57 and 58 pivotally mounted on pin 48. Sides 57 and 58 are joined together by top piece 60 having record catching finger 61. Sides 57 and 58 have cam slots at the bottom ends thereof, each cam slot having portion 63 sloping upwardly and outwardly and portion 64 generally straight up. As is clearly evident in Figures 3 and 5, cam faces 52 and 53 of the record retainer rocker and cam slots 63 and 64 of the recording catching member are laterally offset with respect to key cross piece 36. Thus in the bottom position of the cross piece as seen in Figure 3, record retaining face 51 is in its outward position while record catching finger 61 is in its inner position. As the key members move vertically, a scissors-like action occurs to rock retainer face 51 to its inner position and record catching finger 61 to its outer position.

Shroud 70 functions as a cover for the mechanism and also as a turret over which records may be threaded. Shroud 70 is retained on the upper end of the spindle by bolt 71 and at the bottom end by ears 72 in slots in the turntable and has a slotted side wall in which the record retaining and catching parts work. Thus as seen in Figure 3, the inner position of record catching finger 61 and outer position of record retaining face 51 are with reference to the shroud wall. Conversely when the record retainer moves inwardly and the record catching part moves outwardly, it is with reference to the shroud wall.

As is clearly evident in Figure 3, the vertical portion 52 of the cam face for the record retaining member is somewhat longer than sloping cam face 63 of the record catching rocker. Thus the record catching member will be moved outwardly ahead of inward rocker movement as seen in Figure 6 and then to the position shown in Figure 5. As seen in these two figures, record catching finger 61 has a downward and outward slope. Thus as the finger moves out, the edge of the finger will work into the annular space formed by the reduced inner edges of the bottom and next to the bottom record. Then when the record retainer moves in, the bottom record will be released for dropping on the turntable. Upon further operation of the turret mechanism, the movements are reversed so that the next record in the stack is dropped from the catcher to the retainer.

It will be understood that the turret turns at all times with the turntable and also remains in a fixed vertical position. In order to cycle the changer, means must be provided for elevating and dropping gear 30 with respect to the spindle, this occurring over one revolution of the cycling gear. The mechanism for accomplishing this will now be described.

Well 11 carries pin 75 upon which is rotatively mounted cycling gear 77. This gear has teeth 78 and is mutilated at 79 to leave a blank surface at the working depth circle to clear the teeth of gear 30. The bottom of the gear blank extends beyond the addendum circle of the gear teeth and is formed to provide annular cam surface 81 adapted to extend under the edge of gear 30 and engage the bottom peripheral portion thereof. Cam surface 81 has its low region coincident with blank portion 79 of gear 77. Thereafter the cam surface rises around the gear and finally drops as the blank portion is reached again. As gear 77 is rotated, cam surface 81 riding under gear 30 causes gear 30 to rise and fall through one operating cycle for record feeding.

At blank portion 79 of gear 77, thin gear segment 83 is pivoted at 84 and is movable through a slot in the gear blank to dispose the gear segment teeth at the blank region of gear 77. Thus segment 83, when moved outwardly, presents its teeth as a continuation of the teeth of gear 77 so that in effect a substantially continuous gear is formed. It will be noted that gear 77 carries segment 83 on the bottom thereof. Gear segment 83 carries tailpiece 85 having ears 86. The ears cooperate with pin 86' carried by arm 87 secured to rotatable sleeve 90 journalled in a suitable bearing in motorboard 10. Sleeve 90 carries tone arm 91 and has tone arm lifting pin 93 within the sleeve. Pin 93 cooperates with cam track 95 on the top surface of gear 77 and is so operated as to elevate the tone arm during the time when the tone arm is being moved toward the edge of the record. Cam track 96 is also provided for guiding the tone arm from the record center to the outside edge as is usual.

Other means for operating the tone arm and providing for engagement between gears 30 and 77 to initiate an operating cycle may be provided. Inasmuch as tone arm control means in record changers are well known and since the invention herein does not relate to this part of the changer, further details are unnecssary.

Button 100 is provided for controlling an electric switch from "off" to "on" to start the motor. From "on" to "reject" a push rod connection is provided to gear portion 83 for initiating a changer cycle. Such control means are also well known. Spring pressed arm 102 cooperates with depression 103 in the rim of gear 77 to index the gear to a stopping position.

What is claimed is:

1. In a record changer, a motorboard, a vertical spindle mounted for rotation in said motorboard, a turntable having a central aperture through which said spindle passes and extends above said turntable, motor means for turning said turntable, a shroud carried by said spindle above said turntable and defining a generally cylindrical structure along which records may slide in falling on a turntable, a plurality of record handling units carried by said spindle, each unit comprising a pair of elongated scissors-like members having a horizontal pivot pin, the top ends of said members terminating as record retaining and record catching fingers respectively, the retaining finger being below the catching finger by a distance substantially equal to the thickness of a record, the bottom portions of said member being shaped to form cam faces, a keying member for each record handling unit, said keying member extending vertically from below the motorboard through said turntable and into said turret with the top of said keying member engaging the cam faces, means rotatively secured to all said keying members, said keying members being vertically movable in said turntable but rotatively locked thereto whereby when said turntable moves, the turret keying members and means below said motorboard are rotated, means biasing each record handling unit to a normal position whereby a record retaining finger is normally extending out from the shroud to engage the bottom of a record at the inner edge thereof while the catching finger is withdrawn into the shroud, and means for reciprocating said keying members vertically, said keying members cooperating with said cam faces to successively project the catching fingers between the two bottom records of a stack and withdraw the retaining finger to permit the bottom record to drop and project the retaining finger and finally withdraw the catching finger.

2. The structure according to claim 1 wherein said member below the motorboard is rigidly locked to the keying members and wherein means are provided for rotating said member and raising the same and then dropping the same for a cycle of changer operation.

3. In a record changer, a motorboard, a vertical spindle mounted for rotation in said motorboard, a turntable having a central aperture through which said spindle passes and extends above said turntable, motor means for turning said turntable, a shroud carried by said spindle above said turntable and adapted to house a plurality of record handling units, each record handling unit being adapted to cooperate with a portion of the record at the inner edge thereof, said records being slidable over said shroud, said changer having at least two of said record handling units, each unit comprising an elongated lever and generally U-shaped member extending on both sides of the lever, means for pivotally mounting said member and U-shaped piece so that the two may be moved independently, said lever and U-shaped piece extending vertically and the bight of the U and top of the lever being vertically displaced, one of said two pieces forming a record retaining finger at the top thereof and the other forming a record catching finger above the record retaining finger, means for biasing said two members so that normally the record retaining finger extends outside of the shroud in a record-supporting position while the record catching finger is hidden within the shroud, said two members having the bottom portion thereof shaped to provide cam faces, a generally U-shaped key member for each unit extending through the turntable above and below the same, the bight of said U being within the turret and engaging the cam faces of one record handling unit, said keying members being rotatively locked to the turntable but vertically movable with respect thereto, a member below said turntable rigidly locked to all the keying members, said member having a cam track thereon and means cooperating with and driven by said last named member for moving said member through one vertical oscillation for an operating cycle, and means to maintain said last named member immovable except during an operating cycle of the changer, said keying members during the vertical reciprocation acting on said cam faces to oscillate said record handling units for dropping one record.

ARTHUR C. TEN CATE.

REFERENCES CITED

The following references are of record in the file of this patent:

UNITED STATES PATENTS

| Number | Name | Date |
|---|---|---|
| 1,438,000 | Underhill | Dec. 5, 1922 |
| 1,568,130 | Blackwell | Jan. 5, 1926 |